(12) United States Patent
Nawaki et al.

(10) Patent No.: US 11,709,301 B2
(45) Date of Patent: Jul. 25, 2023

(54) VUV POLARIZER, VUV POLARIZATION DEVICE, VUV POLARIZATION METHOD AND ALIGNMENT METHOD

(71) Applicant: Ushio Denki Kabushiki Kaisha, Tokyo (JP)

(72) Inventors: Yohei Nawaki, Tokyo (JP); Kazuyuki Tsuruoka, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/252,252

(22) PCT Filed: May 31, 2019

(86) PCT No.: PCT/JP2019/021812
§ 371 (c)(1),
(2) Date: Dec. 14, 2020

(87) PCT Pub. No.: WO2019/239926
PCT Pub. Date: Dec. 19, 2019

(65) Prior Publication Data
US 2021/0263206 A1    Aug. 26, 2021

(30) Foreign Application Priority Data

Jun. 12, 2018 (JP) ................. 2018-112342
Jun. 12, 2018 (JP) ................. 2018-112343

(51) Int. Cl.
*G02B 5/30* (2006.01)
*G02F 1/1337* (2006.01)

(52) U.S. Cl.
CPC ......... *G02B 5/3075* (2013.01); *G02B 5/3058* (2013.01); *G02F 1/133788* (2013.01); *C09K 2323/02* (2020.08)

(58) Field of Classification Search
CPC ................ G02B 5/3075; G02B 5/3058; G02F 1/133788; C09K 2323/02
(Continued)

(56) References Cited

U.S. PATENT DOCUMENTS 8,867,041 B2    10/2014   Walsh et al.
2012/0250154 A1 10/2012   Davis
(Continued)

FOREIGN PATENT DOCUMENTS

JP           4778958 B2    9/2011
JP        2014-027316 A    2/2014
(Continued)

OTHER PUBLICATIONS

The extended European search report issued by the European Patent Office dated Mar. 21, 2022, which corresponds to European Application No. 19819497.9-1020 and is related to U.S. Appl. No. 17/252,252.
(Continued)

*Primary Examiner* — Ruiyun Zhang
(74) *Attorney, Agent, or Firm* — Studebaker & Brackett PC

(57) ABSTRACT

The present invention is to provide an appropriate configuration of a VUV polarizer that can be used for such a process as photo-alignment. The VUV polarizer can polarize VUV light not more than 200 nm in wavelength, and has a substrate transparent to the VUV light and a grid on the substrate. The grid is formed of a lot of linear parts in parallel and structured with no filler between the linear parts. A material of each linear part is an oxide of a Group 3 element or Group 4 element, and makes PE not less than 0.2 under an optical constant combination making PE maximum in the VUV range, where $PE=T^2 \times \log_{10}(ER)$, T is the transmittance of the grid, and ER is the extinction ratio of the
(Continued)

grid. A workpiece is subjected to a photo-alignment processing by irradiation of VUV polarized light emitting from the VUV polarizer.

6 Claims, 12 Drawing Sheets

(58) Field of Classification Search
USPC .......................... 428/1.2; 250/492.22, 492.1
See application file for complete search history.

(56) References Cited

U.S. PATENT DOCUMENTS

| | | |
|---|---|---|
| 2014/0016197 A1 | 1/2014 | Davis |
| 2015/0185386 A1 | 7/2015 | Tsuruoka |
| 2016/0200033 A1 | 7/2016 | Lee et al. |

FOREIGN PATENT DOCUMENTS

| | | |
|---|---|---|
| JP | 2014-527203 A | 10/2014 |
| JP | 2015-125280 A | 7/2015 |
| JP | 2015-184577 A | 10/2015 |
| JP | 2017-151168 A | 8/2017 |
| KR | 10-2014-0054139 A | 5/2014 |
| KR | 10-2016-0002633 A | 1/2016 |
| WO | 2005/101112 A2 | 10/2005 |
| WO | 2013/032570 A1 | 3/2013 |

OTHER PUBLICATIONS

An Office Action; "Notice of Reasons for Refusal", mailed by the Japanese Patent Office dated Apr. 26, 2022, which corresponds to Japanese Patent Application No. 2018-112342 and is related to U.S. Appl. No. 17/252,252; with English language translation.

An Office Action; "Notice of Reasons for Refusal", mailed by the Japanese Patent Office dated Apr. 26, 2022, which corresponds to Japanese Patent Application No. 2018-112343 and is related to U.S. Appl. No. 17/252,252; with English language translation.

International Search Report issued in PCT/JP2019/021812; dated Aug. 27, 2019.

International Preliminary Report on Patentability and Written Opinion issued in PCT/JP2019/021812; dated Dec. 15, 2020.

Ono, Kouichi et al.; "4. Dry Etching Technology of High Dielectric Constant (High-k) Materials"; Journal of Plasma and Fusion Research; Apr. 2009; pp. 185-192; vol. 85, No. 4.

Cao, Yu-Chao et al.; "Plasma etching behavior of Y2O3 ceramics: Comparative study with Al2O3"; Applied Surface Science; 2016; pp. 304-309; vol. 366.

An Office Action; "Notice of Reasons for Refusal", mailed by the Japanese Patent Office dated Aug. 30, 2022, which corresponds to Japanese Patent Application No. 2018-112342 and is related to U.S. Appl. No. 17/252,252; with English language translation.

An Office Action; "Notice of Reasons for Refusal", mailed by the Japanese Patent Office dated Aug. 2, 2022, which corresponds to Japanese Patent Application No. 2018-112343 and is related to U.S. Appl. No. 17/252,252; with English language translation.

An Office Action mailed by the Korean Intellectual Property Office dated Aug. 25, 2022, which corresponds to Korean Patent Application No. 10-2020-7036993 and is related to U.S. Appl. No. 17/252,252; with English language translation.

VUV POLARIZER, VUV POLARIZATION DEVICE, VUV POLARIZATION METHOD AND ALIGNMENT METHOD

TECHNICAL FIELD

The present invention relates to a polarization technique for vacuum ultraviolet (VUV) light not more than 200 nm in wavelength, and a technique for forming an alignment layer having a molecular structure aligned to a constant direction on a workpiece.

TECHNICAL BACKGROUND

Among various polarizers, grid polarizers structured with striped fine grids on transparent substrates have been used widely in applications, because polarized light can be irradiated to comparatively wider areas. Among those, in the field of alignment process where anisotropy is induced in the molecular structure of an object, it has been commercialized to carry out alignment by irradiation of polarized light. It is called "photo-alignment" in general.

In photo-alignment, wavelength of polarized light has been shorter to enhance the process efficiency by irradiating light at a higher-energy wavelength. Though previously it was in a shorter wavelength band within the visible range, UV light has been used often recently, and sometimes light in the near UV range such as at 365 nm has been used. Because of the wavelength shortening, absorption type grid polarizers utilizing light absorption in a shorter wavelength range have been developed and used, though previously reflection type grid polarizers such as employing aluminum-made grids were widely used.

In a grid polarizer, a grid is striped being formed of a lot of linear parts extending in parallel to each other. By making each interval between each linear part, i.e., width of each gap, as narrow appropriately as the wavelength of incident light, the linearly polarized light having the electric field component perpendicular to the elongation direction of each linear part emits dominantly from the grid. By controlling the posture of the grid polarizer so that each linear part is directed to a desired direction, the polarized light where the axis, i.e., direction of the electric field component, is directed to the desired direction can be obtained.

In the following description, linearly polarized light where the electric field is along the elongation direction of each linear part in the grid is called "s-polarized light", and linearly polarized light where the electric field is perpendicular to the elongation direction is called "p-polarized light". On the assumption that the elongation direction of each linear part is perpendicular to an incidence plane (the plane perpendicular to a reflection plane and along which an incidence ray and a reflection ray are), these terms are used to distinguish, though usually s-wave is a light wave where the electric field is perpendicular to the incidence plane, and p-wave is a wave parallel to the incident plane.

Fundamental indexes expressing performance of polarizers are extinction ratio (ER) and transmittance T. The extinction ratio ER is the ratio of p-polarized light intensity (Ip) to s-polarized light intensity (ER=Ip/Is) among the intensities of polarized light waves having passed through a polarizer. The transmittance T is the ratio of emitting-out p-polarized light energy (Ip) to all incident energies (Iin) of s-polarized light and p-polarized light (T=Ip/Iin). In an ideal polarizer, ER=∞, and T=50%.

PRIOR-ART REFERENCES

Patent Document

Patent Document 1: JP2015-125280A
Patent Document 2: JP4778958B

SUMMERY OF THE INVENTION

Problems the Invention Will Solve

Grid polarizers are often used in an optical process such as photo-alignment, and, as described, wavelength therein has been shorter for the process efficiency improvement. Accordingly, it would be intended to polarize light at wavelengths further shorter than the near UV range, i.e., 200 nm or below. However, use of a polarizer at 200 nm wavelength or below could cause a stumbling block problem for a desired process. For instance, it may destroy the molecular structure of an object to be irradiated, because of its excessively high energy. VUV is the wavelength band often used in photocleaning where a harmful organism or substance is resolved and then removed by light irradiation. So, use of VUV for such optical process as photo-alignment would be supposedly impossible.

Under the situation as described, a grid polarizer to polarize VUV light has not been intended nor studied so far. Concerning to a grid polarizer polarizing VUV light, accordingly, there has been no reference disclosing a specific teaching, e.g., an adequate grid material, characteristic thereof, nor the like.

Nevertheless of the situation, the inventors considered that if an appropriate configuration for irradiation is provided, it would be possible to use VUV in such a process as photo-alignment, and to carry out the process more efficiently by the higher energy. Considering this, the inventors have eagerly studied appropriate configuration of VUV polarizers and photo-alignment techniques using VUV polarizers, and has reached the concept of the present invention. An object of the invention is, accordingly, to provide an appropriate configuration of a VUV polarizer that can be used for such a process as photo-alignment, and an appropriate technical configuration of photo-alignment by VUV light.

Means for Solving the Problem

For solving the problem, the VUV polarizer according to the invention is a polarizer for polarizing VUV light not more than 200 nm in wavelength, and has a substrate transparent to the VUV light and a grid on the substrate. The grid is formed of a lot of linear parts in parallel and structured with no filler between the linear parts. A material of each linear part is an oxide of an element of Group 3 or Group 4, and makes PE not less than 0.2 under an optical constant combination making PE maximum in the VUV range, where $PE=T^2 \times \log_{10}(ER)$, T is the transmittance of the grid, and ER is the extinction ratio of the grid.

Further for solving the problem, this VUV polarizer may have the configuration where another element is substituted partially for the element of Group 3 or Group 4 in the material of each linear part, and the substitution ratio is not more than a ratio where PE is 0.2 under an optical constant combination making PE maximum in the VUV range.

Further for solving the problem, a VUV polarizer according to the invention is capable of polarizing VUV light not more than 200 nm in wavelength, and has a substrate transparent to VUV light and a grid on the substrate. The grid is formed of a lot of linear parts in parallel and structured with no filler between the linear parts. A material of each linear part is hafnium oxide, yttrium oxide, hafnium-oxide-based multinary compound where another element is substituted partially for hafnium, or an yttrium-oxide-based multinary compound where another element is substituted partially for yttrium.

Further for solving the problem, a VUV polarization device according to the present invention has the VUV polarizer, and an atmosphere controller to replace an atmosphere surrounding the VUV polarizer with an inert gas.

Further for solving the problem, a VUV polarization method according to the present invention irradiates non-polarized VUV light not more than 200 nm in wavelength onto the VUV polarizer to polarize.

Further for solving the problem, this VUV polarization method may be carried out as the VUV polarizer is disposed in an atmosphere of inert gas replaced with.

Further for solving the problem, an alignment method according to the present invention forms an alignment layer having a molecular structure aligned to a constant direction on a workpiece. In this method, the alignment layer is formed by irradiation of polarized VUV light not more than 200 nm wavelength onto the workpiece. The polarized VUV light is obtained by irradiation of non-polarized VUV light onto the VUV polarizer. In this method, the workpiece is placed at a position within 1 to 20 millimeters from the VUV polarizer, and the irradiation dose of the VUV light onto the workpiece is not less than 40 mJ/cm$^2$ and not more than 4000 mJ/cm$^2$.

Further for solving the problem, this alignment method may be carried out as the VUV polarizer is disposed in an atmosphere of inert gas replaced with.

Effect of the Invention

As described later, according to the present invention, the VUV polarizer, the VUV polarization device, or the VUV polarization method enjoys a high polarization performance for VUV light. In addition, a high anti-oxidation property is obtained even under VUV irradiation, sustaining the high polarization performance stably for a long term.

In the configuration where the atmosphere controller replaces an atmosphere surrounding the VUV polarizer with an inert gas, oxidation of the grid is suppressed further, and thus the effect of the long-term stable high polarization performance is enhanced further.

In the alignment method according to the present invention, the alignment process efficiency is improved because the photo-alignment is carried out by the polarized VUV light. In this, the long-term stable high polarization performance enables the excellent alignment process stably for a long term.

EMBODIMENTS OF THE INVENTION

Figure 1:
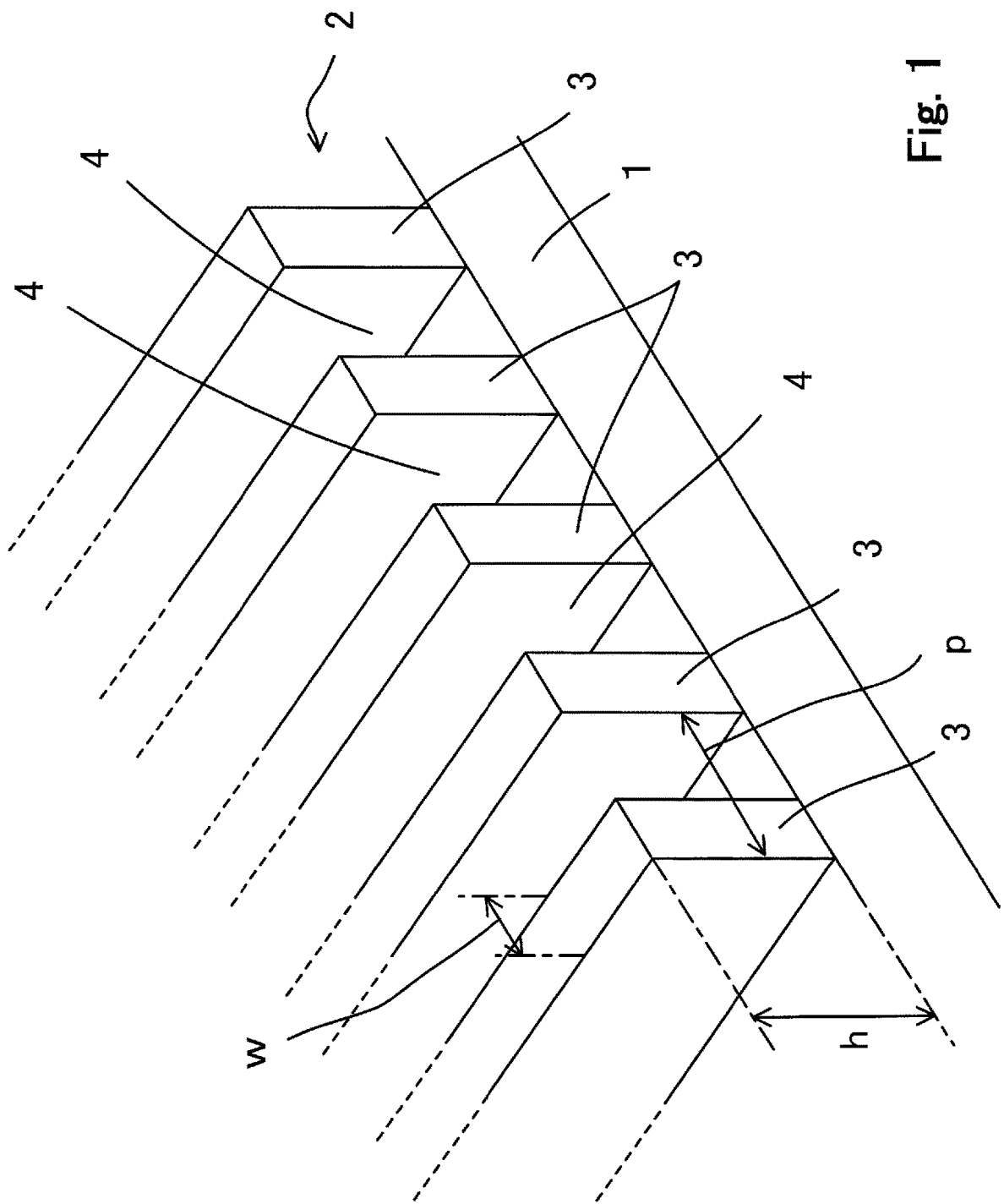
FIG. 1 is a perspective schematic view of a VUV light polarizer in a first embodiment.

Embodiments of the present invention are described as follows. FIG. 1 is a perspective schematic view of a VUV polarizer in a first embodiment. The VUV polarizer shown in FIG. 1 has a grid 2 provided on a transparent substrate 1.

"Transparent" for the substrate 1 means "allowing light at a target wavelength of light to be polarized through a polarizer". Because the target wavelengths are assumed to be in the VUV range of 200 nm or less in this embodiment, quartz glass, e.g., synthetic quartz, is adopted as material of the transparent substrate 1. The transparent substrate 1 has an adequate thickness, considering the mechanical strength for retaining the grid 2 and the handling easiness as optical component. The thickness of the substrate is, for example, 0.5 to 10 mm.

The grid 2, as shown in FIG. 1, is stripe shaped, having a lot of linear parts 3 extending in parallel. Grid polarizers perform polarization functions on the configurations where regions having different optical constants are arranged alternately and in parallel. Each space 4 between each linear part 3 is called "gap", and the polarization function is obtained by each linear part 3 and each gap 4. The width w of each linear part 3 and the width of each gap 4 are adequately designed so as to obtain the polarization function for light at a target wavelength. Specifically, the width of the gap 4 is not more than the target wavelength approximately. In this embodiment, no filler is not provided to in each gap 4. Therefore, the refractive index of each gap 4 is the refractive index of an atmosphere surrounding the polarizer. The atmosphere is usually air, i.e., the refractive index 1.

The VUV polarizer in the embodiment functions according to the absorption model. That is, whereas s-polarized light propagates with attenuation by the absorption because the electric field is divided and then localized by the permittivity of each linear part 3, p-polarized light propagates without much attenuation because the electric field is subjected to neither division nor localization essentially. Accordingly, p-polarized light emits dominantly from the transparent substrate 1, and thus the polarization function is obtained. Detailed description on the function model of absorption type grid polarizers is omitted because it is disclosed in the patent document 1.

In the VUV polarizer in the embodiment, a material of each linear part 3 is especially optimized for VUV polarization. This point is described as follows.

What needs to be considered first on material of each linear part 3 is the anti-oxidation property in VUV polarizers. As well known, VUV light is much absorbed to oxygen molecules in air, producing a lot of highly oxidizing species such as oxygen radicals, ozone, and hydroxyl radicals. Therefore, when a polarizer with each linear part having a low anti-oxidation property is used for VUV polarization, each linear part would be oxidized in a very short term, changing the performance. The performance change is that the transmittance and the extinction ratio is not be obtained as expected, that is, appearing as a deterioration.

Considering this point, first, a high anti-oxidation material is selected for each linear part 3. In this, the inventors reinterpreted "anti-oxidation" considering that the grid polarizer is the absorption type in this embodiment. In absorption type grid polarizers, materials adequately absorbing light of target wavelengths are used for grids. Those are often oxide metals such as titanium oxide in the UV range. Considering this point, the inventors re-interpreted "anti-oxidation" as not "hard to be oxidized", but as "property of not being oxidized any more". In a word, the inventors interpreted the oxidation state stability as the anti-oxidation property.

In the research by the inventors, it has turned out that transition metals in Group 3 and Group 4, which are easy to be positive divalent to tetravalent, form steady oxides easily. So, those would be generally suitable as component elements of oxides in grid materials. Still, practically the compatibility with transparent substrates should be considered. Crystalline oxides such as quartz, zirconium oxide crystal and magnesium oxide crystal can be used as materials for transparent substrates in grid polarizers because of the optical transparencies. In this, when a grid has an oxidization stability lower than an oxide forming a transparent substrate, the grid material is more likely to be reduced by oxygen being taken up to the transparent substrate, and subsequently re-oxidized by oxidizing species, e.g., oxygen, oxygen radical and ozone, in the atmosphere. Due to unstable reductions associated with the transparent substrate and the re-oxidations by species in the atmosphere, the optical performance would change easily. Therefore, such a material is not suitable for a grid.

Figure 2:
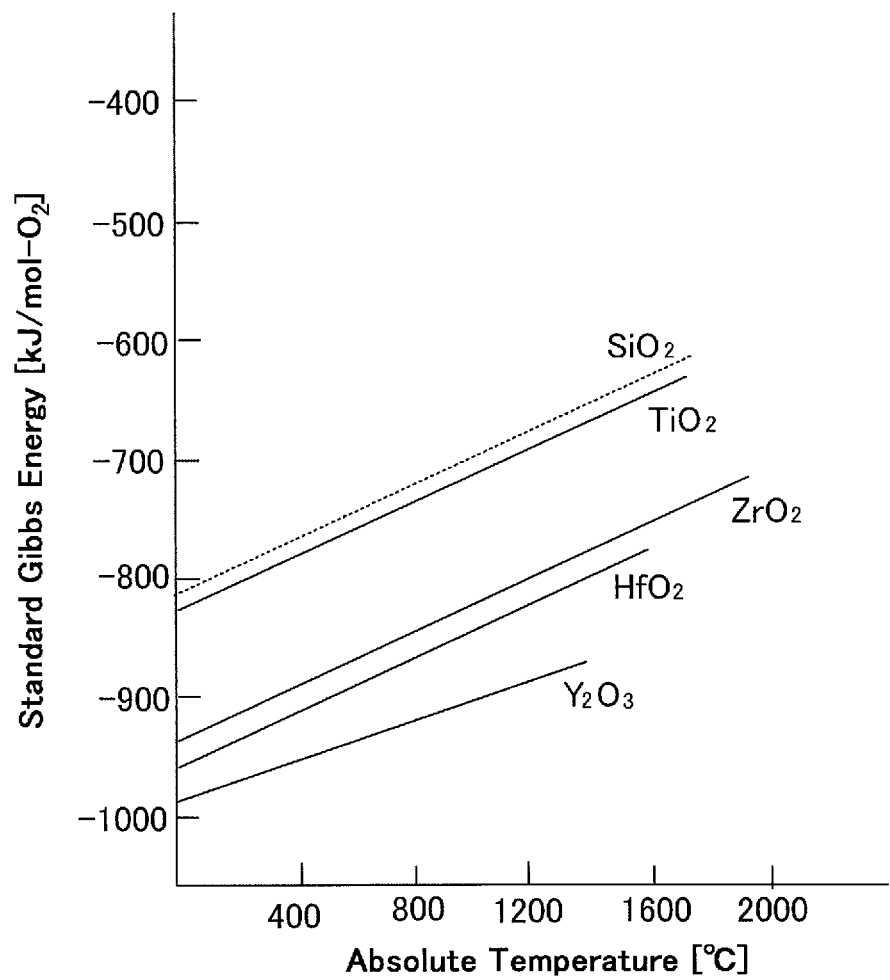
FIG. 2 is an Ellingham diagram of oxides of typical elements in Group 3 and Group 4.

The oxidization stabilities of oxide metals are known as so-called Ellingham diagram. FIG. 2 is an Ellingham diagram of oxides of typical elements in Group 3 and Group 4. Because the transparent substrate 2 is made of vitreous silica in this embodiment, the standard chemical potential of silica is also added for comparison. The horizontal axis of FIG. 2 is absolute temperature, and the vertical axis is standard Gibbs energy.

As shown in FIG. 2, titanium oxide, zirconium oxide, hafnium oxide and yttrium oxide have standard Gibbs energies lower than silica, exhibiting high oxidation stabilities. Therefore, these materials may be candidates for the grid material in the VUV polarizer.

On the other hand, only a high oxidation stability is not enough as the grid material in the VUV polarizer. The fundamental properties as a polarizer, i.e., the transmittance and the extinction ratio, must be performed sufficiently. The inventors researched further those four candidate materials, investigating whether those can be the grid material in the VUV polarizer.

Figure 3:
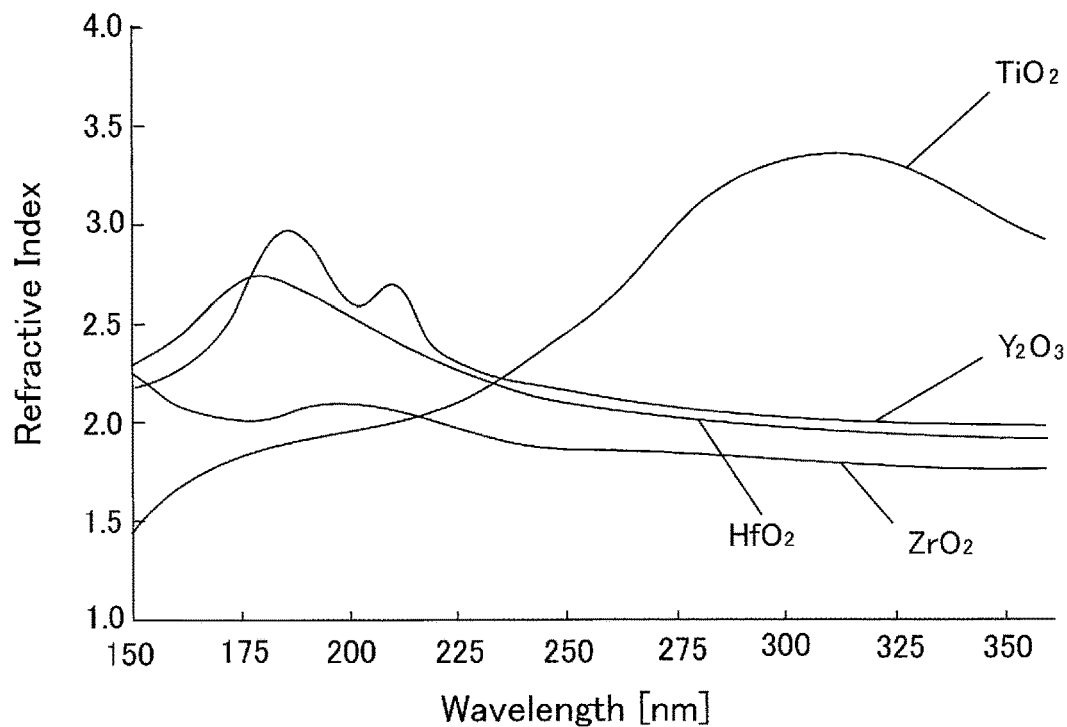
FIGS. 3(1) and 3(2) show optical characteristics of titanium oxide, zirconium oxide, hafnium oxide and yttrium oxide in the UV range.
Figure 3:
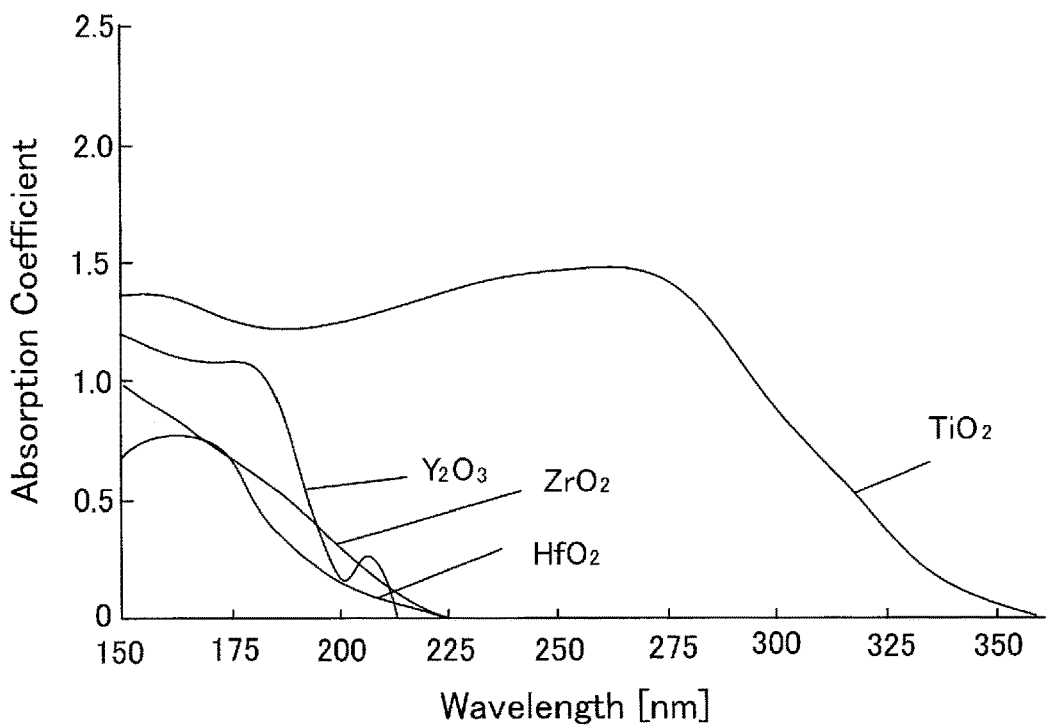

FIGS. 3(1) and 3(2) show optical characteristics of titanium oxide, zirconium oxide, hafnium oxide and yttrium oxide in the UV range. FIG. 3(1) shows the refractive index, and FIG. 3(2) shows the absorption coefficient.

As described, grid polarizers need to have high contrasts of refractive indexes in stripe-shaped structures. In this embodiment, because no filler is provided in the gaps between the linear parts, i.e., air, the material needs to have a refractive index largely different from that of air ($\approx 1$). Concerning this, as shown in FIG. 3(1), titanium oxide and zirconium oxide have refractive indexes not exceeding 2 in almost all the VUV range not more than 200 nm.

Because the VUV polarizer in this embodiment is the absorption type, the grid material needs to adequately absorb VUV light. Concerning this, as shown in FIG. 3(2), zirconium oxide has the absorption coefficient below 0.5 in the VUV range, not being suitable as the grid material because of the low absorbance. Whereas the absorption coefficient of hafnium oxide is below 0.5 in the range from 180 to 200 nm, it exceeds 0.5 in the wavelength range shorter than it. In particular, hafnium oxide has the absorption coefficient over 0.5 at 172 nm, which is important in the VUV spectrum, being preferable to use. From these results, it is concluded that hafnium oxide and yttrium oxide are the preferable candidates for the grid material in the VUV polarizer.

The inventors made further considerations on these two candidate materials from point of view of the manufacturing process. This point is described as follows.

Transition metal oxides such as hafnium oxide and yttrium oxide may form metal-halogen compounds with low volatilities, and, in general, are known as hardly processable materials because of strong metal-oxygen bonds. Still, hafnium oxide has been expected as the material of gate insulation films in semiconductor devices, and it is possible to etch with a $BCl_3$-based plasma. In the future, if a hafnium-oxide etching system is developed for the semiconductor device manufacturing, supposedly it could be diverted. On the other hand, it has been reported that yttrium oxide demonstrated a high tolerance to fluorocarbon plasma. Thus, yttrium oxide is expected as the material of protection films for surfaces exposed to plasma in a plasma etcher. Therefore, yttrium oxide is inferior compared with hafnium oxide from point of view of processability, and this situation would not change in the future. Form point of view of processability, after all, hafnium oxide would be more preferable for the grid material of the VUV polarizer.

On these considerations, the VUV polarizer in the first embodiment adopts hafnium oxide as the grid material. Showing specific sizes thereof, the thickness of the transparent substrate 1 is 0.7 mm, the width w of each linear part 3 is 10 to 50 nm, and the height h is 50 to 300 nm, and accordingly the aspect ratio is about 1 to 30. The pitch p of each linear part 3 is 80 to 200 nm, and accordingly the width of the gap 4 is about 30 to 190 nm.

An operation of this VUV light polarizer is described as follows. Following is the description on an embodiment of the VUV light polarization method according to the invention.

In the disposed VUV polarizer, the grid 2 is located at the non-polarized VUV incident side, and the transparent substrate 1 is located at the emission side. Among non-polarized VUV waves, s-polarized waves are selectively absorbed to attenuate while those propagate through each linear part 3 and each gap 4 of the grid 2. As a result, p-polarized waves dominantly pass through the transparent substrate 1, emitting therefrom.

According to the VUV polarizer in the embodiment, because each linear part 3 is formed with hafnium oxide in the grid 2 where no filler in is provided in the gap 4, the high anti-oxidation property is obtained even under the VUV irradiation environment, and the high-performance polarization is enabled even in the VUV range stably for a long term.

A VUV polarizer in the second embodiment is described next. The VUV polarizer in the second embodiment also has a transparent substrate 1, and a grid 2 provided on the transparent substrate 1, as well as the first embodiment shown in FIG. 1.

As described, grid materials of VUV polarizers need to have not only the high anti-oxidation property, but also the high fundamental properties, i.e., the transmittance and the extinction ratio as a polarizer. As an index for evaluating the properties, the inventors have reached the concept of the quantity PE expressed by the formula $PE=T^2 \times \log_{10}(ER)$. The VUV polarizer in the second embodiment is based on this concept.

For grid polarizers, the transmittance and the extinction ratio are generally in the trade-off relation. The extinction ratio would decrease when the transmittance is intended to increase, and by contrast the transmittance would decrease when the extinction ratio is intended to increase. This is the same as for absorption type grid polarizers. While use of a material highly absorbent to light at a target wavelength could increase the extinction ratio, it would decrease the transmittance. Use of a low-absorption material, which could increase the transmittance, would decrease the extinction ratio.

Therefore, overall performance as a grid polarizer should be expressed with the product of the transmittance T and the extinction ratio ER. In this, the extinction ratio ER should be expressed as a common logarithm because it changes largely depending on such parameters as widths of each linear part, each gap and aspect ratio, hereinafter referred as "grid dimensions". So, the product should be $T \times \log_{10}(ER)$.

Figure 4:
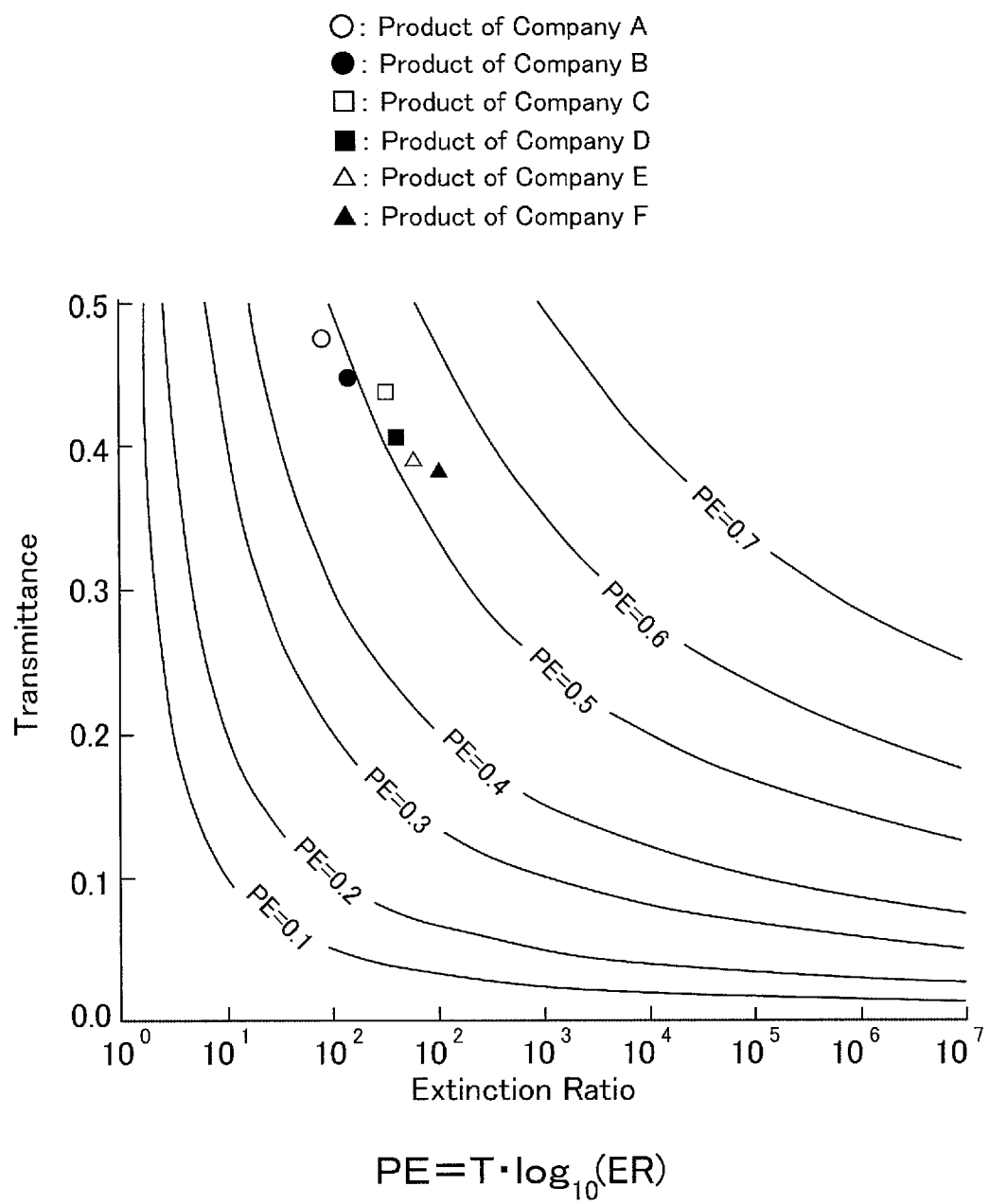
FIG. 4 shows examined polarization performances of commercially available grid polarizers for the near UV polarization.
Figure 5:
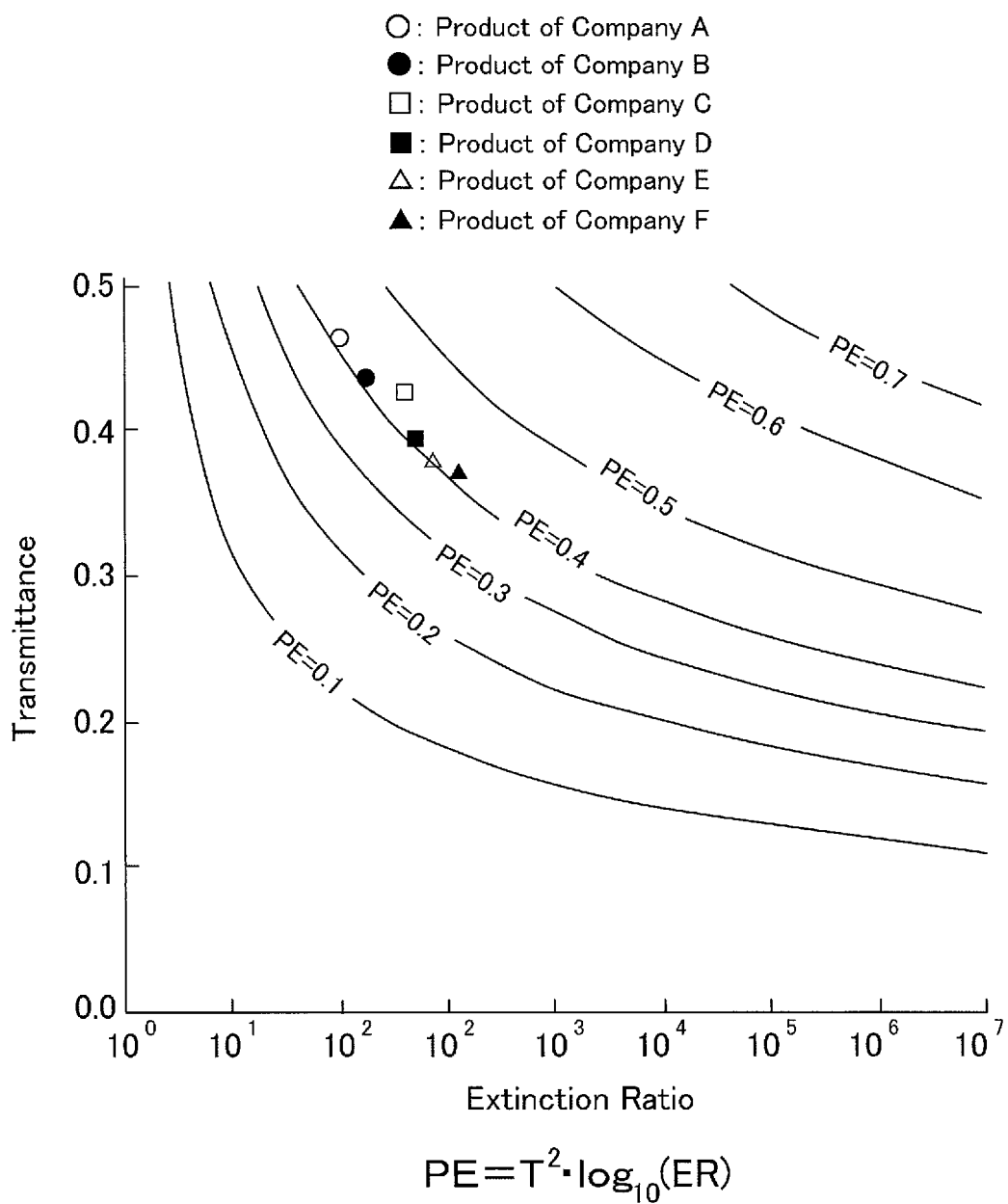
FIG. 5 also shows examined polarization performances of commercially available grid polarizers for the near UV polarization.

Several grid polarizers for polarizing light in the near UV range, i.e., 200 to 400 nm, are commercially available from some companies. The inventors obtained several products, which have been evaluated as of almost the equal polarization performance, and measured the transmittance and the extinction ratio thereof. A result of this is shown in FIG. 4 and FIG. 5. FIG. 4 and FIG. 5 show polarization performances of the grid polarizers commercially available for the near UV polarization.

In FIG. 4 and FIG. 5, each horizontal axis is the extinction ratio expressed with the common logarithm, and each vertical axis is the transmittance. As shown in FIG. 4 and FIG. 5, the grid polarizers exhibited overall performances similar to each other, having different combinations of values of the extinction ratio and the transmittance. What is interesting is that each dot expressing each performance of each grid polarizer is not on any line of $T \times \log_{10}(ER)$ incomprehensively as shown in FIG. 4, under the trade-off relation between the extinction ratio and the transmittance. Thus, the inventors changed the lines to $T^2 \times \log_{10}(ER)$. Then it has turned out that each dot is almost on one of the lines as shown in FIG. 5.

What this result means is that not $T \times \log_{10}(ER)$ but $T^2 \times \log_{10}(ER)$ is desirable in evaluating the overall performance of a grid polarizer. Advancing the research further based on this point, the inventors have discovered that the value of PE, hereafter referred as "overall polarization performance", is preferably 0.2 or more practically.

$PE \geq 0.2$ means that if the transmittance is, for instance, 0.2 (20%), the required extinction ratio would be 105 or more, and conversely if the extinction ratio is, for instance, 10, the transmittance needs to be about $\sqrt{(0.2)} \approx 0.45$ (45%) or more.

Based on the described overall polarization performance PE, the inventors advanced the research further pursuing more preferable grid materials for VUV polarizers. This point is described as follows.

The transmittance and the extinction ratio are obtained by a simulation if a target wavelength, values of the optical constants n, k and a grid dimension are known, where n is the real part of the refractive index, and k is the imaginary part thereof, i.e., the extinction coefficient. This means provisional values of the optical constants and the grid dimension bring the extinction ratio and the transmittance at each wavelength, and teach combinations of values of the optical constants establishing $PE \geq 0.2$. The result of a simulation examination in this respect is shown in FIG. 6.

In this, a grid dimension considered typical as of VUV polarizers was provided. The dimension was, concretely, the linear part width w=20 nm, the grid height h=100 nm, and the pitch p=100 nm. Accordingly, the aspect ratio (h/w) was 5, and the gap width was 80 nm.

Figure 6:
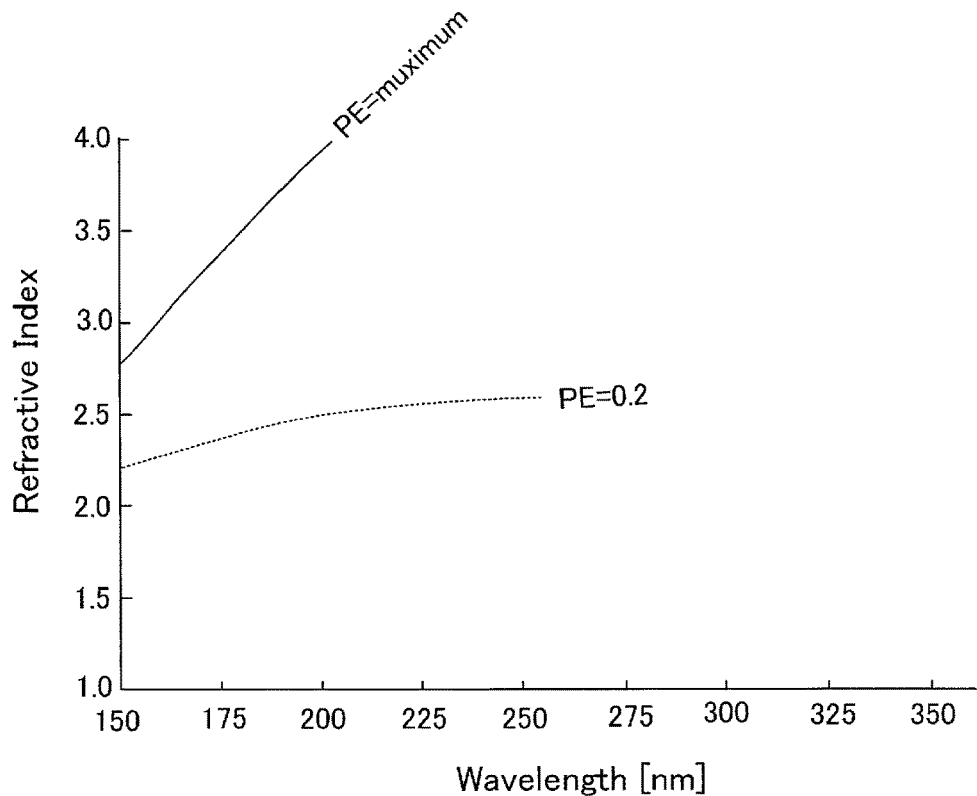
FIGS. 6(1) and 6(2) show the result of a simulation experiment investigating that PE≥0.2 is established under how refractive index n and absorption coefficient a are.
Figure 6:
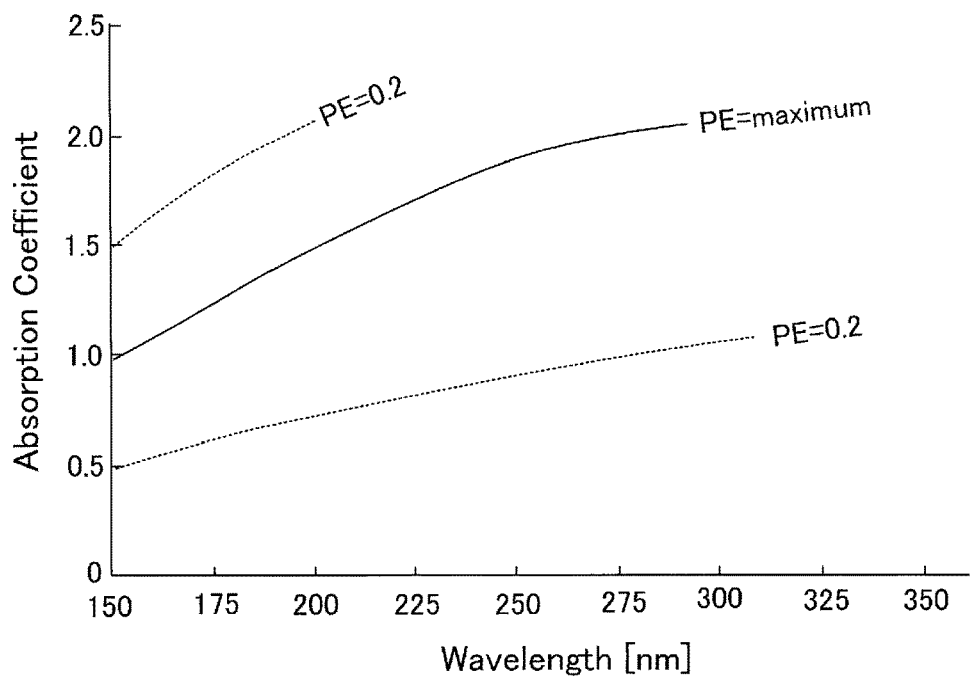

In the simulation experiment of which result is shown in FIG. 6, the transmittance T and the extinction ratio ER were calculated as various combinations of values of n and k were applied on the provided grid dimension. The executed calculations were based on the FDTD (finite-difference time-domain) method, and a software used therein was MATLAB of MathWorks Inc., Massachusetts, US. MATLAB is their registered trademark.

Combinations of values of the optical constants n and k where PE, i.e., $T^2 \times \log_{10}(ER)$, was 0.2 or more were investigated among various n and k. A result of this is shown in FIGS. 6(1) and 6(2). The vertical axis in FIG. 6(1) is n, and the horizontal axis is wavelength. The vertical axis in FIG. 6(2) is the absorption coefficient a calculated from the extinction coefficient k, and the horizontal axis is wavelength. The absorption coefficient a is obtained by $a=4\pi k/\lambda$ where $\lambda$ is wavelength. In FIG. 6(1), the dotted line is where PE=0.2, the solid line is where PE was maximum. In FIG. 6(2) as well, the dotted line is where PE=0.2, and the solid line is where PE was maximum.

The result shown in FIG. 6(1) and FIG. 6(2) teach that if a material has high n to some extent in the wavelength range not more than 200 nm and has a in a certain range of value, it can be adopted as the grid material in the VUV polarizer. A reason a has the upper and lower limits is supposedly because an excessively high k makes the transmittance too much low due to increase of the absorption, while an adequate absorption is indispensable for the polarization performance.

Figure 7:
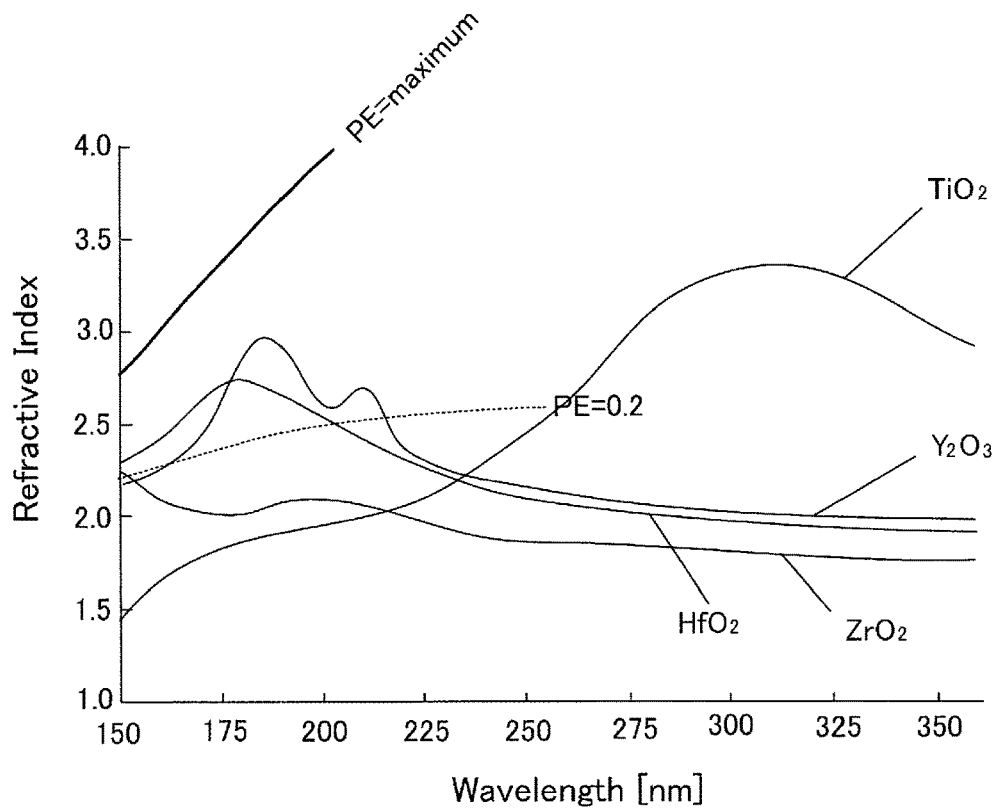
FIGS. 7(1) and 7(2) show graphed values of n and a for oxides of Group 3 and Group 4 elements in the VUV range.
Figure 7:
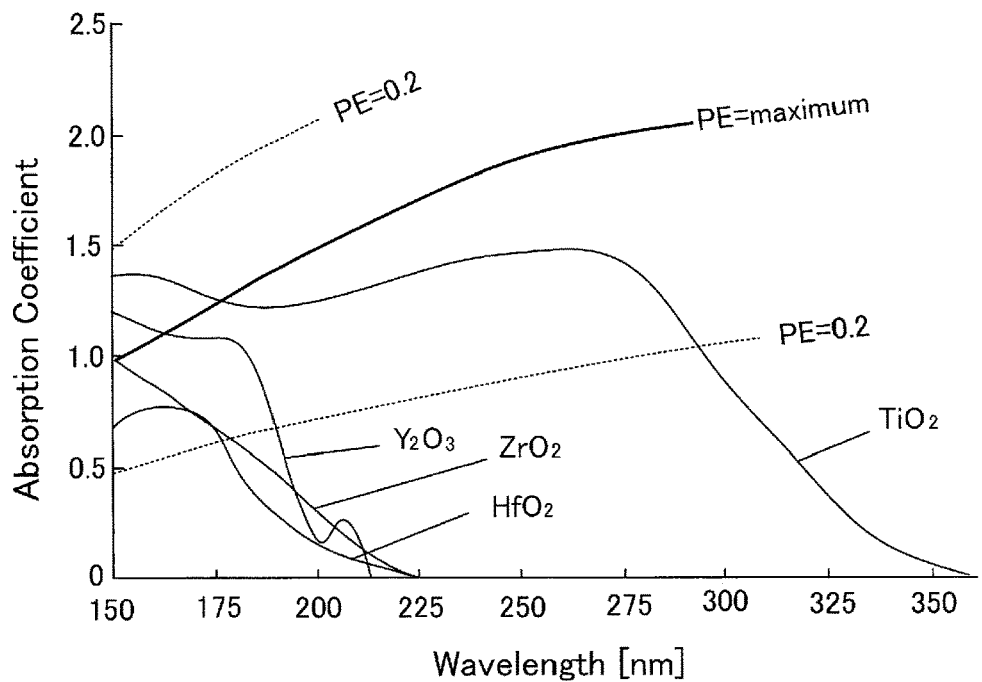

The inventors advanced the research further based on the result shown in FIGS. 6(1) and 6(2), investigating materials establishing $PE \geq 0.2$. A result of this is shown in FIGS. 7(1) and 7(2). In FIGS. 7(1) and 7(2), values of n and a in the VUV range are graphed for described oxides of elements in Group 3 and Group 4. In FIGS. 7(1) and 7(2), lines where PE=0.2 and a line where PE is maximum are added to the graphs, which are the same as in FIGS. 3(1) and 3(2) respectively.

As shown in FIGS. 7(1) and 7(2), it has turned out that hafnium oxide and yttrium oxide have combinations of values of n and a establishing $PE \geq 0.2$ in the VUV range. Hafnium oxide has values of a making PE below 0.2 at wavelengths more than about 180 nm. However, at the wavelength 172 nm, which is important in the VUV spectrum as described later, hafnium oxide has a making PE more than 0.2, being expected as the grid material.

From the experiment and the investigation as described, the inventors have concluded that hafnium oxide and yttrium oxide could be as the grid material in the VUV range. Such a grid material may include another partially substituted element for the processability improvement, the refractive index adjustment, or the like. In these cases as well, it is preferable that PE is 0.2 or more. This point is described as follows, taking hafnium oxide as an example.

Figure 8:
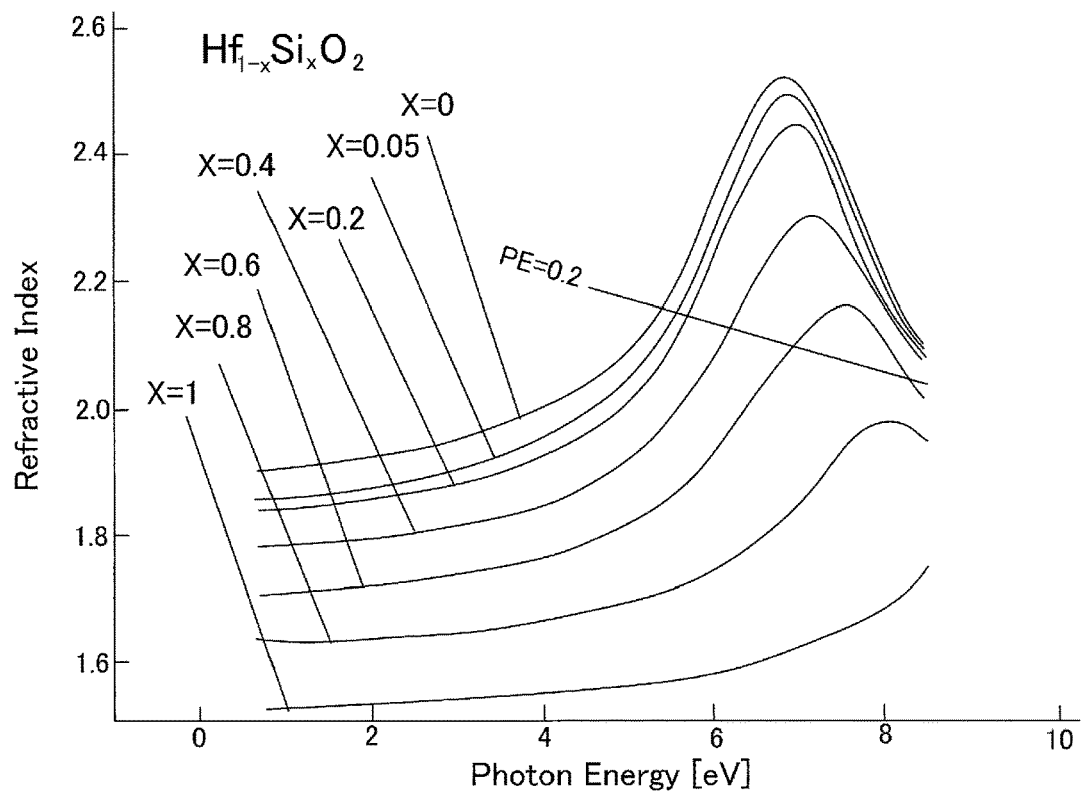
FIGS. 8(1) and 8(2) show changes of n and k when silicon is substituted partially for hafnium in hafnium oxide, where FIG. 8(1) is a graph of n to wavelength, and FIG. 8(2) is a graph of k to wavelength.
Figure 8:
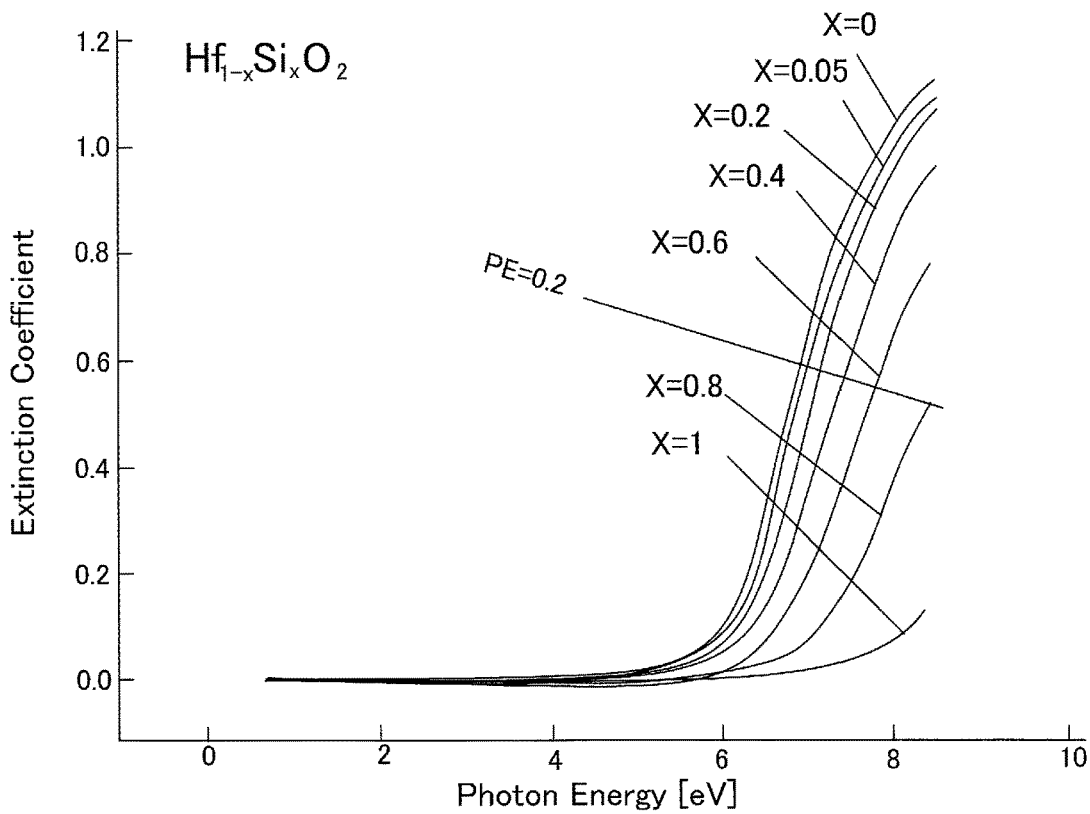
Figure 9:
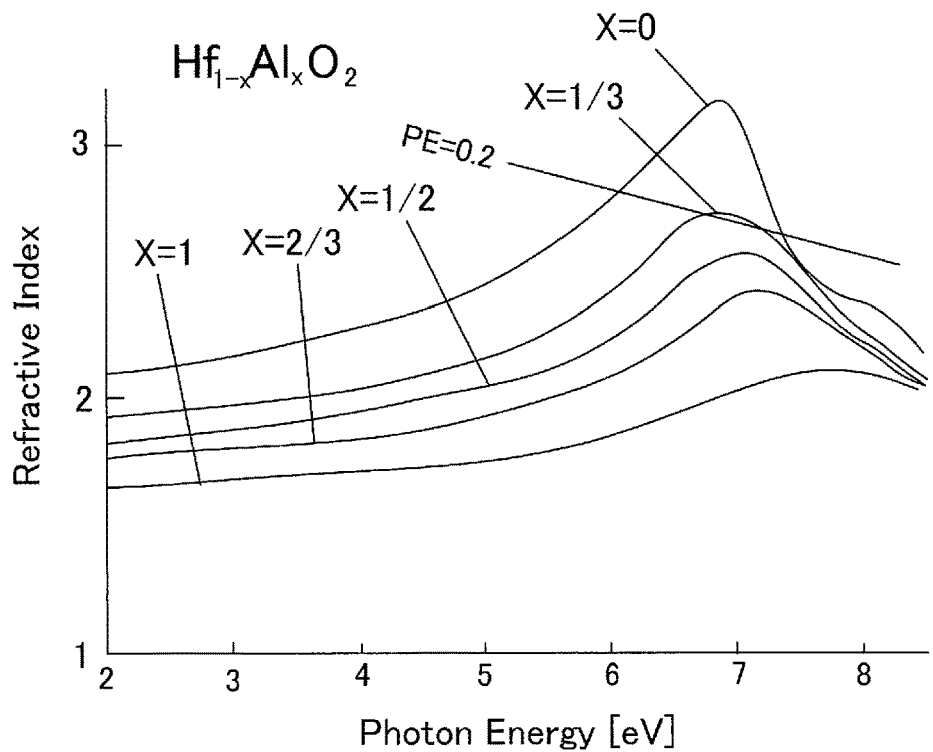
FIGS. 9(1) and 9(2) show changes of n and k when aluminum is substituted partially for hafnium in hafnium oxide, where FIG. 9(1) is a graph of n to wavelength, and FIG. 9(2) is a graph of k to wavelength.
Figure 9:
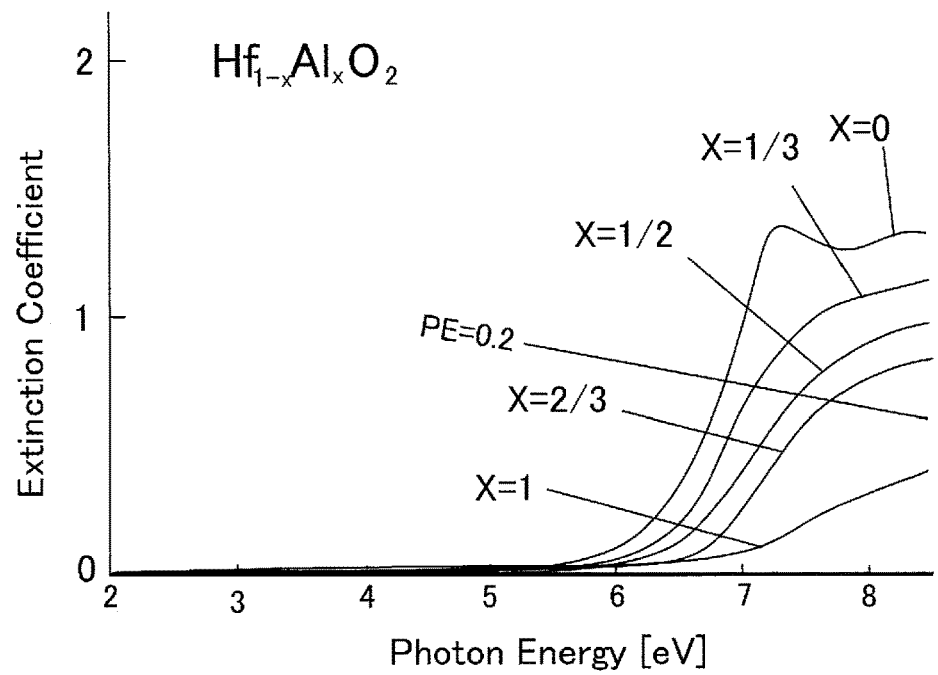

FIGS. 8(1) and 8(2) show changes of n and k when silicon is substituted partially for hafnium in hafnium oxide. FIG. 8(1) shows graphs of photon energy vs. n, and FIG. 8(2) shows graphs of photon energy vs. k. FIGS. 9(1) and 9(2) show changes of n and k when aluminum is substituted partially for hafnium in hafnium oxide. As well, FIG. 9(1) shows graphs of photon energy vs. n, and FIG. 9(2) shows graphs of photon energy vs. k.

As shown in FIGS. 8(1) and 8(2), n and k decrease in the VUV range as the substitution ratio of silicon increases. The substitution ratio here is the composition ratio, i.e., the value x in $Hf_{1-x}Si_xO_2$.

In FIGS. 8(1) and 8(2), lines where PE=0.2 are added to the graphs for the evaluation. When x=0.6 in FIG. 8(1), the refractive index n decreases over the line PE=0.2 at the photon energy about 7 eV. This is the wavelength about 180 nm because of the relation $\lambda=1240/E$ between the photon energy E and wavelength $\lambda$. As for the extinction coefficient k, PE decreases over 0.2 at about 7.8 eV when x=0.6. This corresponds to about 160 nm. When x is 0.6 or more, therefore, the composition ratio of silicon substituted for hafnium in hafnium oxide would be preferably 0.6 or less, because PE is 0.2 or more at wavelengths shorter than about 160 to 180 nm. The ratio x=0.4 is more preferable because the wavelength range where PE is 0.2 or more is expanded to the longer wavelength side. Hafnium silicate, which may have the oxidation number 4 ($HfSiO_4$) or 1 (HfSiO), exhibited a similar result in any cases.

In FIG. 9(1) and FIG. 9(2) showing a result for aluminum substitution, i.e., hafnium aluminate, lines of PE=0.2 are also added for the evaluation. As shown in FIG. 9(1), when the aluminum composition ratio x=1/3, PE is over 0.2 where the photon energy is from 6.8 eV ($\approx$182 nm) to 7.4 eV ($\approx$168 nm). As for the extinction coefficient k, PE exceeds 0.2 where the photon energy is more than about 7.2 eV (at wavelengths shorter than 172 nm approximately), when x=1/3. Therefore, the ratio x of 0.3 or less supposedly makes PE 0.2 or more for both of n and k within the wavelength range about 180 to 150 nm. That is, the aluminum substitution ratio is preferably 0.3 or less, i.e., $Hf_{1-x}Al_xO_2$, $0 \le x \le 0.3$.

In substituting other elements partially for hafnium, composition ratios establishing PE$\ge$0.2 are preferably as well. In hafnium oxide including a partially substituted material, which may be a hafnium-oxide-based multinary compound, the substituted material may consist of two or more elements.

Yttrium oxide as well may include another element partially substituted for yttrium, being yttrium silicate or yttrium aluminate for instance. This is preferable in view of establishing PE$\ge$0.2 to enable a high polarization performance in the VUV range. An yttrium-based multinary compound with a substituted material consisting of two or more elements may be used as well.

Next, a manufacturing method of VUV light polarizers is described.

Figure 10:
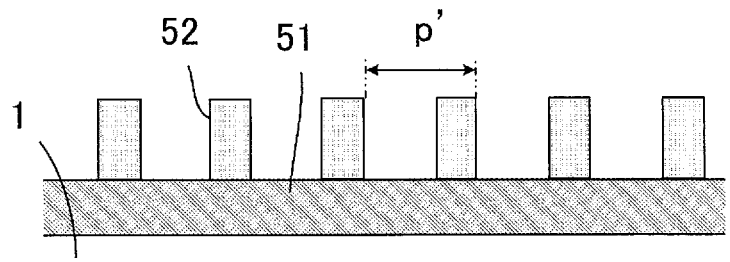
FIGS. 10(1) to 10(5) are schematic views showing a manufacturing process of each VUV polarizer in each embodiment.
Figure 10:
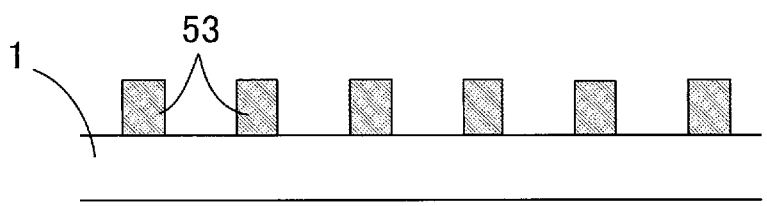
Figure 10:
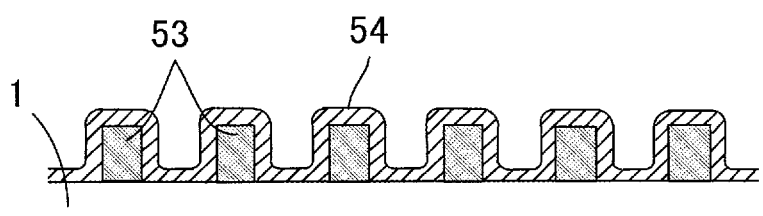
Figure 10:
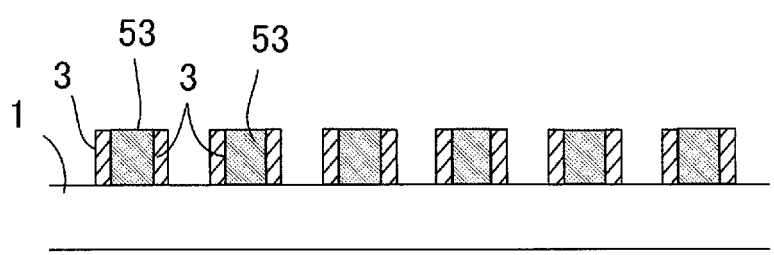
Figure 10:
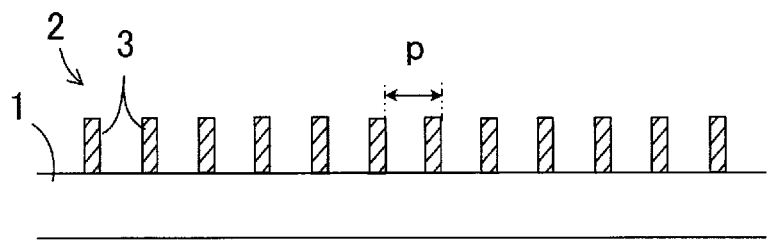

FIGS. 10(1) to 10(5) are schematic views showing a manufacturing process of the VUV light polarizers in the embodiments. Manufacture of a VUV polarizer according in any embodiment preferably adopts a process where a sacrifice layer is formed as an intermediate structure. FIGS. 10(1) to 10(5) show one example of this process.

In manufacturing a VUV light polarizer in any embodiment, first a film 51 for the sacrifice layer is deposited on a transparent substrate 1, FIG. 10(1). A material with a high etching selection ratio to a grid material is adopted preferably for the sacrifice layer. For instance, the material of the sacrifice layer may be silicon. While kinds of methods are adoptable in deposing the film 51 for the sacrifice layer, it may be, for instance, plasma chemical vapor deposition (CVD).

Next, a resist is coated on the film 51 for the sacrifice layer, and then patterned by photolithography to form a resist pattern 52. The resist pattern 52 is stripe-shaped, i.e., line-and-space-shaped because of the grid polarizer manufacturing. Still, the pitch of the resist pattern 52, which is shown with p' in FIG. 10(1), is twice the pitch in the fabricated grid.

Next, the film 51 is etched through the resist pattern 52 as a mask. After the etching, the resist pattern 52 is removed by an ashing. As a result, the sacrifice layer 53 is formed as shown in FIG. 10(2). The etching is anisotropic directed perpendicularly to the transparent substrate 1. The sacrifice layer 53 is also stripe-shaped, being formed of a lot of linear parts extending in parallel.

Next, a deposition process of a film 54 for the grid is carried out. The film 54 for the grid is formed on each side and top surfaces of each linear part of the sacrifice layer 53 as shown in FIG. 10(3). The film 54 is preferably deposited by an atomic layer deposition (ALD). In depositing a hafnium oxide film as the film 54, for instance, tetrakis-ethylmethyl-amino hafnium (TEMAH) is used as a precursor gas, and vapor water is used oxidant. The temperature of a susceptor where the transparent substrate 1 is placed is approximately 200 to 400° C., e.g. 250° C., and the hafnium oxide film is deposited by introducing vapor water and the precursor gas pre-heated to about 75 to 95° C. at a pulse interval of 200 to 500 milliseconds into a chamber. The pressure in the chamber is about 100 to 500 mTorr. Ozone may be introduced as an oxidant. As career gas and purge gas therein, such a gas as nitrogen or argon is introduced.

After depositing the film 54, it is partially etched as shown in FIG. 10(4). "Partially" here means removing only portions on the tops of the sacrifice layer 53 and portions deposited directly on the transparent substrate 1, i.e., the bottoms of the gaps. As described, this etching is carried out by the $BCl_3$-based plasma etching when the film 54 is formed of hafnium oxide. For instance, the film 54 is partially etched by an electron cyclotron resonance (ECR) or capacitive coupling (CC) plasma of $BCl_3$ with argon as buffer gas. In this, an electric field perpendicular to the substrate is applied with a bias voltage, making the etching anisotropic. This is so as not to etch the portions deposited on the side surfaces of the sacrifice layer 53. Oxygen gas or chlorine gas may be added to the $BCl_3$ gas in this plasma etching. By the plasma etching, each linear part of the grid is completed.

Then an etching to remove the sacrifice layer 53 is carried out. In this, only the material of the sacrifice layer 53 is selectively etched. When the sacrifice layer 53 is formed of, for instance, silicon, it can be selectively removed by a plasma etching using such a gas as $CF_4$. By removing the sacrifice layer 53, the VUV light polarizer in the embodiment is fabricated as shown in FIG. 10(5). The pitch p between the linear parts 3 in the fabricated polarizer is half of the pitch p' in the resist pattern 52.

In this manufacturing method, the height of the sacrifice layer 53 formed intermediately needs to be accurate in particular because it defines the height of the fabricated grid 2. The aspect ratio of the sacrifice layer 53, which is a factor to define the aspect ratio of the fabricated grid 2, needs to be higher for a higher aspect ratio of the grid 2. Considering these, a film of such a material as carbon may be formed and patterned by photolithography as a mask layer on the film 51 for the sacrifice layer, and then the film 51 for the sacrifice layer may be etched through this mask layer. The mask layer itself is made higher in the aspect ratio to be tolerant sufficiently for a longer-time anisotropic etching, enabling formation of the sacrifice layer 53 with a uniform height.

Figure 11:
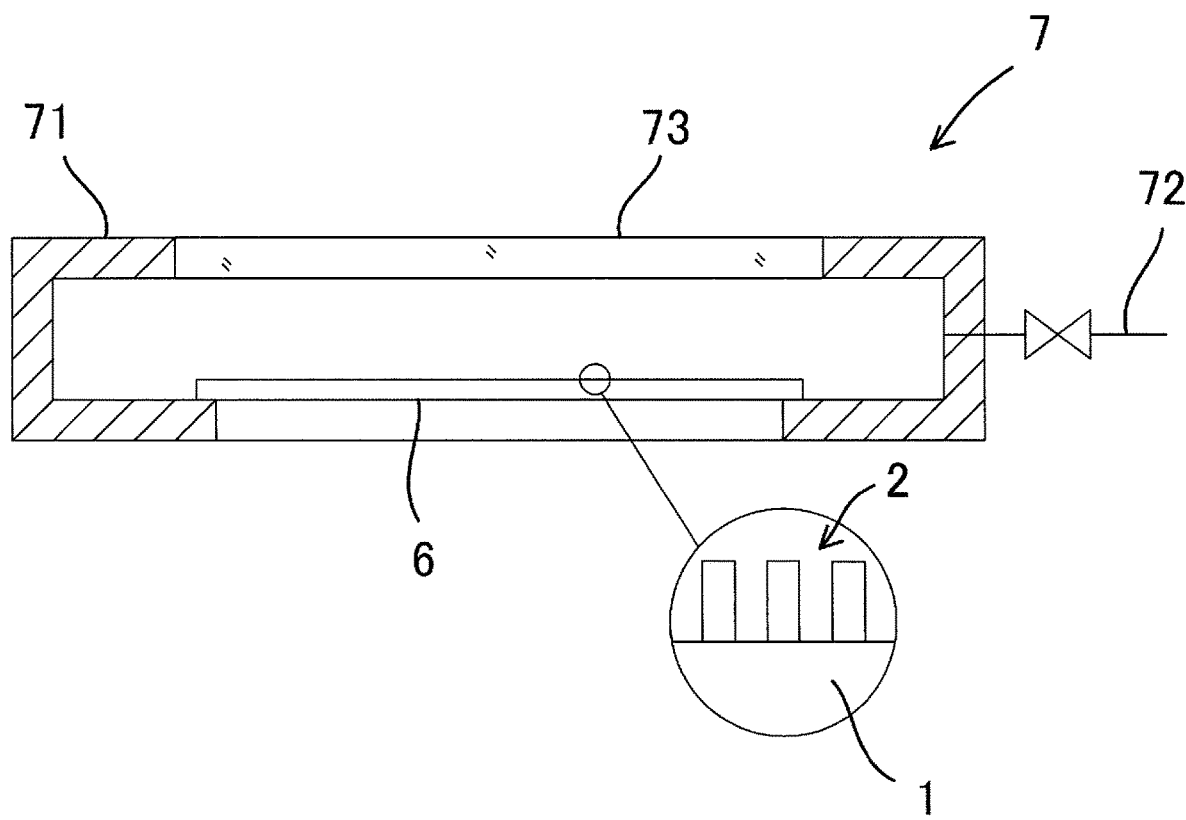
FIG. 11 is a front schematic cross-sectional view of a VUV light polarization device in an embodiment.

Next are described a VUV polarization device in an embodiment of the invention, and a VUV light polarization method in an embodiment of the invention. FIG. 11 is a front schematic cross-sectional view of the VUV polarization device in the embodiment. The VUV polarization device shown in FIG. 11 has a VUV polarizer 6, and an atmosphere controller 7 to replace the atmosphere surrounding the VUV polarizer 6 with an inert gas.

In this embodiment, the atmosphere controller 7 has a vessel 71 in which the VUV polarizer 6 is disposed, and a gas introduction system 72 to introduce the inert gas into the vessel 71. The vessel 71 is configured with an incident-side opening and an emission-side opening. An incident-side window 73 is fit in the incident-side opening. The incident-side window 73 is formed of a material with good transparency to VUV light, e.g., quartz glass.

The VUV polarizer 6 disposed in the vessel 71 shuts the emission-side opening and fixed on the inner surface of the vessel 71 with a fastening member (not shown). As magnified in FIG. 11, the VUV polarizer 6 is directed as the grid 2 is located inside the vessel 71. Accordingly, the grid 2 is exposed to the atmosphere in the vessel 71.

The gas introduction system 72 is capable of introducing the inert gas at a flow rate enough to replace an atmosphere in the vessel 71. There are small clearances at the places where the incident-side window 73 and the VUV polarizer 6 are installed. Thus, the inert gas introduced by the gas introduction system 72 leaks from these clearances after filling the vessel 71. Therefore, the atmosphere in the vessel 71 is replaced with the introduced inert gas. The vessel 71 may be made air-tight, being equipped with a pumping line to evacuate the inert gas.

An operation of the VUV polarization device, that is, a VUV polarization method is as follows. The device is disposed on an optical path interconnecting a light source emitting VUV light and an object to irradiate polarized VUV light. Non-polarized VUV light from the light source passes through the incident-side window 73, reaches the VUV polarizer 6 in the vessel 71, and then is polarized. The polarized VUV light emitting from the VUV polarizer 6 is irradiated onto the object.

As described, because the VUV polarizer 6 has the grid where each linear part 3 is formed with hafnium oxide, it performs a high VUV polarization function stably for a long term. In addition, because the grid 2 especially in the VUV polarizers 6 is disposed in the atmosphere of the inert gas replaced with, each linear part 3 is prevented from deterioration due to oxidation. Accordingly, the high polarization function is sustained more stably for a long term.

Though the VUV polarizer 6 is used also as a window shutting the emission-side opening in the described embodiment, it may be shut by another window. In this case, whole the VUV polarizer 6 is exposed to the atmosphere of the inert gas replaced with. Still, the structure is simplified where the grid 2 is commonly used as the emission-side window.

Alternatively, the device may have the configuration where a light source is disposed in the vessel 71, that is, may be an assembly including a light source. In this configuration, the vessel 71 would be a member corresponding to a so-called lamphouse.

Next, an alignment method according to an embodiment of the invention is described.

Figure 12:
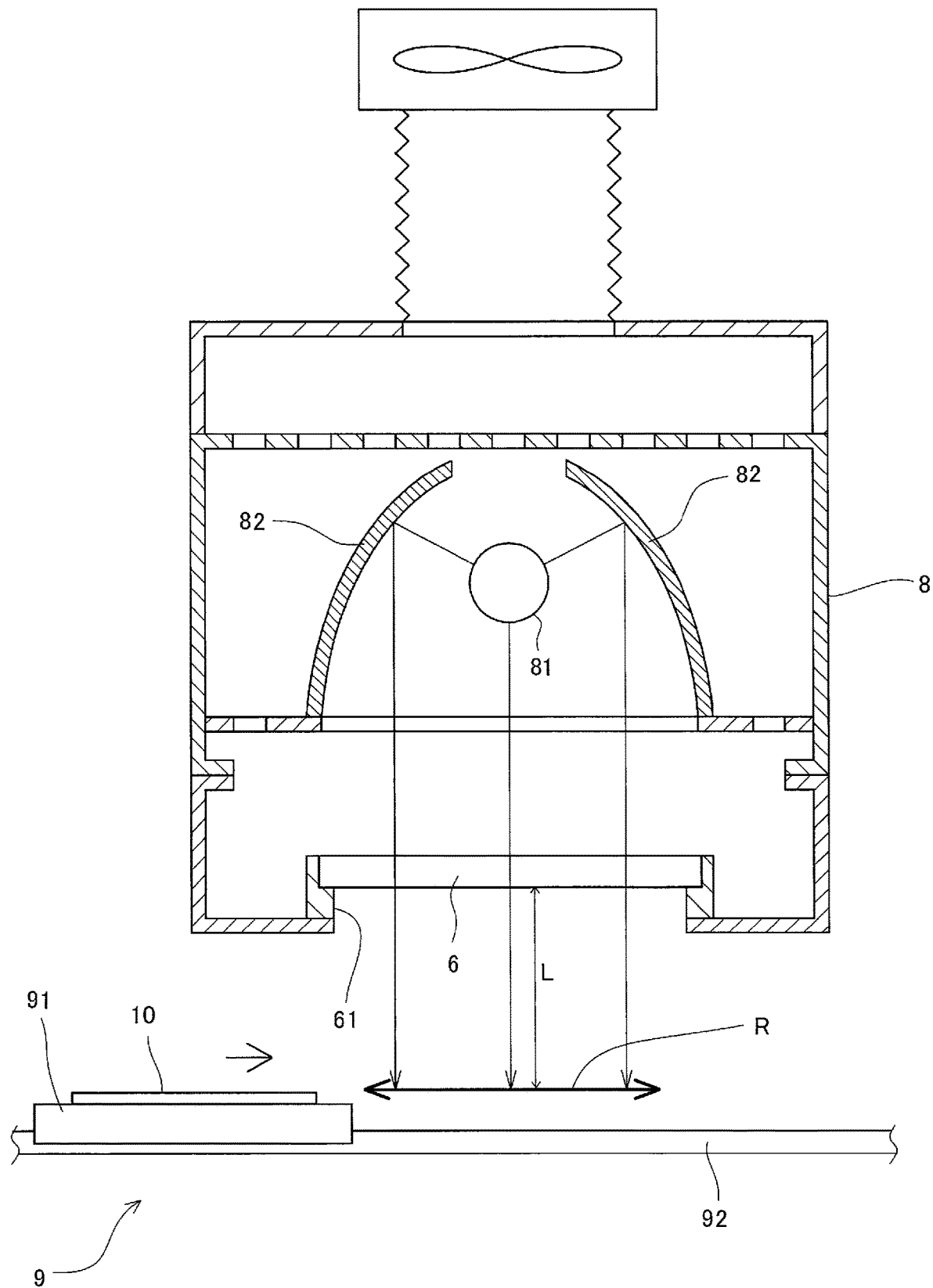
FIG. 12 is a front schematic view of a photo-alignment device in which the VUV polarizer in the embodiment is mounted.

FIG. 12 is a front schematic view of a photo-alignment device in which the VUV polarizer in the embodiment is mounted. The photo-alignment device shown in FIG. 12 is used for obtaining a photo-alignment layer, which is utilized in a liquid crystal display. The photo-alignment layer is formed on a workpiece 10 by irradiating polarized VUV light thereto. This device has a lamphouse 8 including a light source 81 capable of emitting VUV light, a VUV polarizer 6, and a workpiece transfer system 9 for transferring the workpiece 10 to a VUV irradiation region R.

Such a lamp as excimer lamp and low-pressure mercury vapor lamp can be used as the light source 81. In particular, an excimer lamp, which radiates light with a wavelength regarded as single, is preferable because it is free from unnecessary heating of the workpiece 10 and free from unnecessary reactions. For instance, a 172-nm wavelength excimer lamp filled with xenon gas for discharge may be used. A pair of long-shaped mirror 82 is disposed behind the light source 81.

The VUV polarizer 6 is installed on the emission side in the lamp house 8. For instance, the VUV polarizer 6 is retained in a frame 61 as a unit component and installed in the lamphouse 8 to shut an emission opening thereof. As described, the polarization device may employ an atmosphere controller to replace an atmosphere in the lamp house 8 with an inert gas.

The workpiece 10 is transparent and board-shaped in this example. The workpiece transfer system 9 has a stage 91 on which the workpiece 10 is placed, and a mechanism for moving the stage 91 linearly through the irradiation region R. Concretely, the workpiece transfer system 9 has a linear guide 92 for guiding the linear movement of the stage 91, a linear actuator (not shown), and other components. The transfer line is extended through the irradiation region R just beneath the lamphouse 8. A loading robot (not shown) is disposed at one side to the irradiation region R. For unloading, the loading robot is used commonly, otherwise an unloading robot is disposed at the other side to the irradiation region R. The workpiece 10 may have a film member adhering thereon to form a photo-alignment layer.

Nitrogen gas purging may be applied to the lamphouse 8 to suppress the VUV absorption therein. Nitrogen gas may be introduced also for cooling the VUV polarizer 6 and/or for preventing such a contaminant as siloxane from adhering to the VUV polarizer 6.

The irradiation distance (shown with L in FIG. 12) from the VUV polarizer 6 to the workpiece 10 is preferably about 1 to 40 mm. If longer than 40 mm, the irradiance might decrease over a limit, due to the VUV absorption by the atmosphere (air). A length shorter than 1 mm may cause such a problem as the very-high accuracy requirement to the workpiece transfer system 9.

Next, an operation of this photo-alignment device is described. Following is a description on an alignment method according to an embodiment of the invention.

A workpiece 10 is placed on the stage 91 by the loading robot (not shown). The workpiece transfer system 9 transfers the workpiece 10 through the irradiation region R, while polarized VUV light is irradiated in the irradiation region R. Thus, the workpiece 10 is subjected to the alignment processing. After the alignment processing, the workpiece 10 is picked up by the loading robot from the stage 91 when the stage 91 returns to the loading position, otherwise picked up from the stage 91 by an unloading robot disposed at the other side.

According to this method, the alignment processing is carried out with the polarized light in the high-energy VUV band. Therefore, the alignment efficiency is enhanced. In this, the high-quality alignment processing is enabled stably for a long term because the high polarization performance is obtained stably for a long term.

In this method, the width of the irradiation region (width along the direction perpendicular to the plane of FIG. 12) is longer than the width of the workpiece 10, though not shown in the figures. The irradiation dose on the workpiece 10 depends on the length of the irradiation region R along the transfer line, the speed during passing the irradiation region R, and the irradiance. The irradiation dose is preferably about 40 to 4000 mJ/cm$^2$. If it is less than 40 mJ/cm$^2$, the irradiation would be short of, making the photo-alignment insufficient. The irradiation dose more than 4000 mJ/cm$^2$ might deteriorate the workpiece 10 due to the high energy of the VUV light.

In described each embodiment, the VUV polarizer may have the structure where an antireflection layer and/or protective layer are formed on the incident side of the grid 2. For instance, a silica layer as protective layer may be formed covering the grid 2. In consideration of adhesion of such a contaminant as siloxane, a protective layer may be provided so that the contaminant can be wiped off.

The photo-alignment device may process a sheet-shaped film as a workpiece. In this case, the device may employ a roll-to-roll transfer system for transferring the workpiece.

EXPLANATION OF SYMBOLS

1: Transparent Substrate
2: Grid
3: Linear Part
4: Gap
53: Sacrifice Layer
6: VUV Polarizer
7: Atmosphere Controller
71: Vessel
72: Gas Introduction System
8: Lamphouse
81: Light Source
9: Workpiece Transfer System
91: Stage
10: Workpiece

The invention claimed is:

1. A VUV polarizer polarizing VUV light not more than 200 nm in wavelength,
comprising:
a substrate transparent to the VUV light; and
a grid on the substrate;
wherein
the grid is formed of a lot of linear parts in parallel and structured with no filler between the linear parts;
a material of each linear part is an oxide of a Group 3 element or Group 4 element, and
another element is substituted partially for the Group 3 element or Group 4 element; and
the substitution ratio is not more than a ratio where PE is 0.2 under an optical constant combination making PE maximum in the VUV range, where $PE=T^2 \times \log_{10}(ER)$, T is transmittance of the grid, and ER is extinction ratio of the grid.

2. A VUV polarizer polarizing VUV light not more than 200 nm in wavelength,
comprising:
a substrate transparent to the VUV light; and
a grid on the substrate;
wherein
the grid is formed of a lot of linear parts in parallel and structured with no filler between the linear parts;
a material of each linear part is hafnium-oxide-based multinary compound where another element is substituted partially for hafnium in hafnium oxide, or an yttrium-oxide-based multinary compound where another element is substituted partially for yttrium in yttrium oxide; and
the substitution ratio is not more than a ratio where PE is 0.2 under an optical constant combination making PE maximum in the VUV range.

3. The VUV polarizer as claimed in the claim 2, wherein
the material of each linear part is hafnium-oxide-based multinary compound where silicon or aluminum is substituted partially for hafnium in hafnium oxide, and the substitution ratio is not more than a ratio where PE is 0.2 under an optical constant combination making PE maximum in the VUV range.

4. The VUV polarizer as claimed in the claim 1, wherein
the substitution ratio is not more than a ratio where PE is 0.2 at 172 nm in wavelength under the optical constant combination making PE maximum in the VUV range.

5. The VUV polarizer as claimed in the claim 2, wherein
the substitution ratio is not more than a ratio where PE is 0.2 at 172 nm in wavelength under the optical constant combination making PE maximum in the VUV range.

6. The VUV polarizer as claimed in the claim 3, wherein
the substitution ratio is not more than a ratio where PE is 0.2 at 172 nm in wavelength under the optical constant combination making PE maximum in the VUV range.

* * * * *